Dec. 29, 1942.  T. S. HUXHAM  2,306,732
MOLDING FIXTURE
Filed May 8, 1941  3 Sheets-Sheet 1

INVENTOR
T. S. HUXHAM
BY
ATTORNEY

Dec. 29, 1942.  T. S. HUXHAM  2,306,732
MOLDING FIXTURE
Filed May 8, 1941  3 Sheets—Sheet 2

INVENTOR
T. S. HUXHAM
BY
ATTORNEY

Dec. 29, 1942.  T. S. HUXHAM  2,306,732
MOLDING FIXTURE
Filed May 8, 1941  3 Sheets-Sheet 3

INVENTOR
*T. S. HUXHAM*
BY
*H. G. Bandfield*
ATTORNEY

Patented Dec. 29, 1942

2,306,732

UNITED STATES PATENT OFFICE 2,306,732

MOLDING FIXTURE

Trevor S. Huxham, Chatham, N. J., assignor to Bell Telephone Laboratories, Incorporated, New York, N. Y., a corporation of New York Application May 8, 1941, Serial No. 392,507

8 Claims. (Cl. 18—34)

This invention relates in general to the assembly of electrical members and more particularly to laminated molding fixtures for temporarily holding such parts in precise positions while a plastic material is injected about the parts to permanently secure them in those positions.

The great multiplicity of contact members in certain telephone switching mechanisms necessitates closing mounting of the parts and very accurate spacing to insure satisfactory operation under service conditions. Spring pile-ups have heretofore been built up by assembling strips of insulating material, such as phenol fibre between adjacent conducting members. However, with respect to the required spacing of the contact members the normal dimensional limits of thickness of phenol fibre stock are relatively very wide and a process of selection has therefore been necessary in order to obtain insulators of the required thickness. This is particularly necessary due to the fact that under certain conditions the variation from the required thickness is accumulative so that when a large number of contact members are arranged in a pile-up the over-all dimension takes into account the accumulative effect of the variation in individual members. Furthermore, even with selected insulators, variations in curvature of the insulators or the contacting members often necessitate adjustments to insure the proper initial spacing. Finally, after a period of service further shrinkage of the fibre insulators often occurs, necessitating readjustment in some cases.

It is, therefore, an object of the present invention to assemble spring pile-ups and similar parts so that they are precisely located in predetermined positions without adjustment and are maintained in those positions under service conditions.

To accomplish this object and in accordance with the features of the invention the contact members are precisely held in predetermined positions by accurately ground gauge blocks of a molding fixture and while so held, suitable insulated material is injected into prearranged apertures of the contact members to permanently lock these members in such positions. The invention may be more clearly understood by reference to the accompanying drawings in which.

Figure 1:
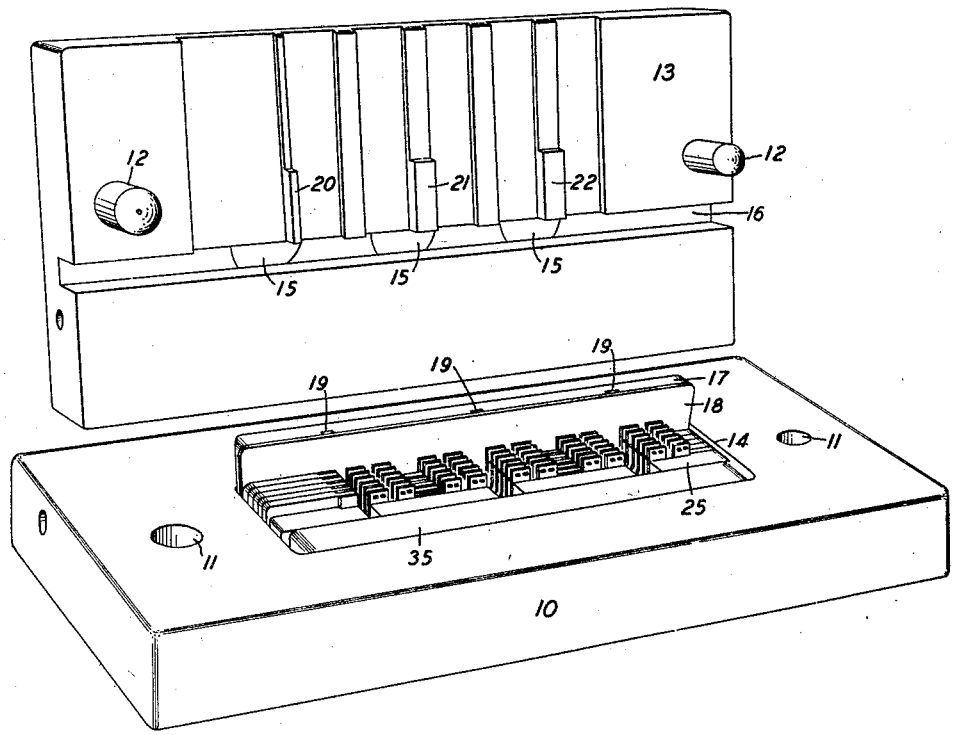
Fig. 1 is a perspective view of the top and bottom members of a mold embodying features of the invention showing contact members precisely located by means of gauge blocks.
Figure 2:
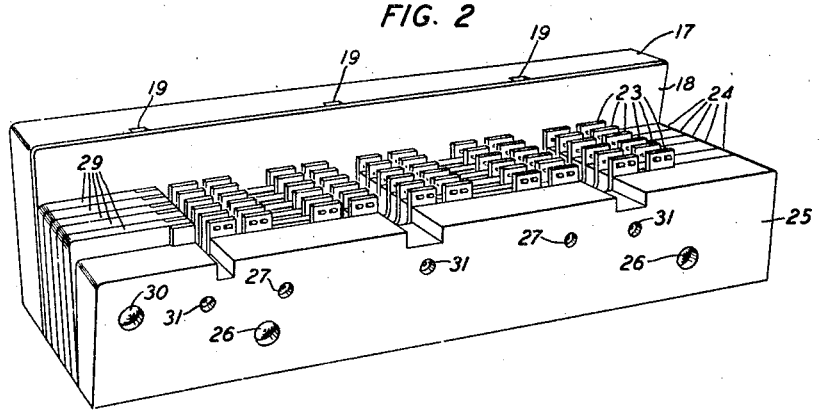
Fig. 2 is a perspective view of the assembly of contact members and gauge blocks.
Figure 3:
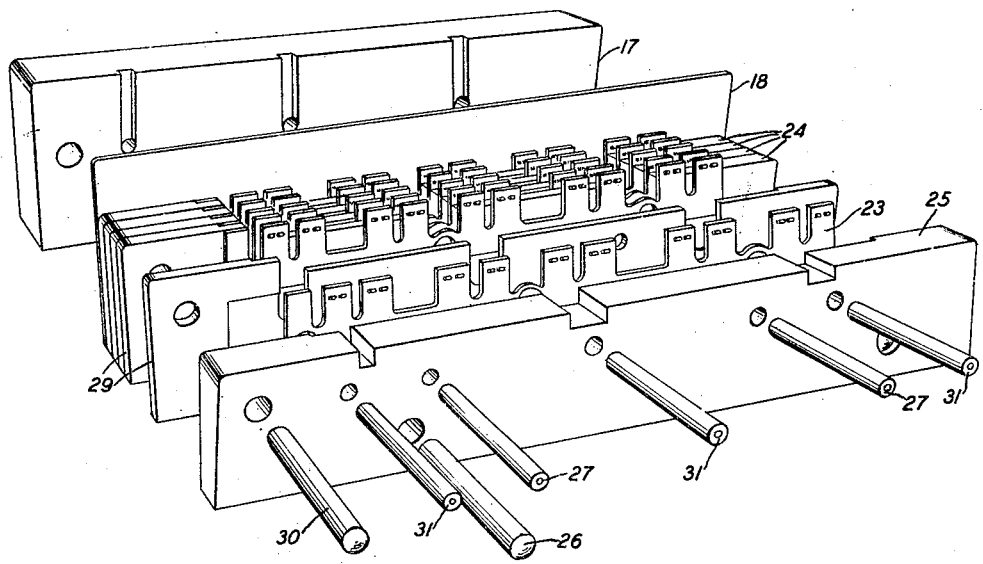
Fig. 3 is an exploded view showing various parts arranged in position to be assembled as shown in Fig. 2.
Figure 4:
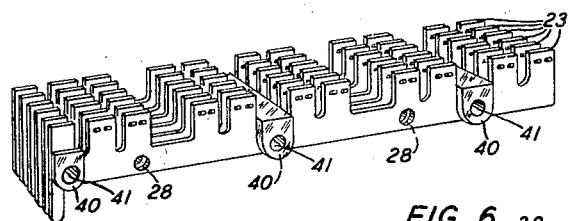
Fig. 4 is a perspective view of a crossbar switch member with parts permanently locked in position.
Figure 5:
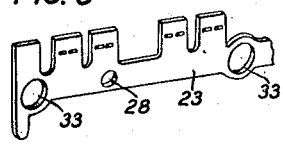
Fig. 5 is a perspective partial view of one of the contact members.
Figure 6:
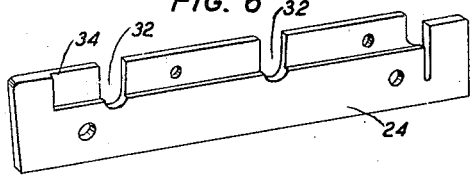
Fig. 6 is a perspective view of a gauge block provided with a slot for receiving a contact bar.
Figure 8:
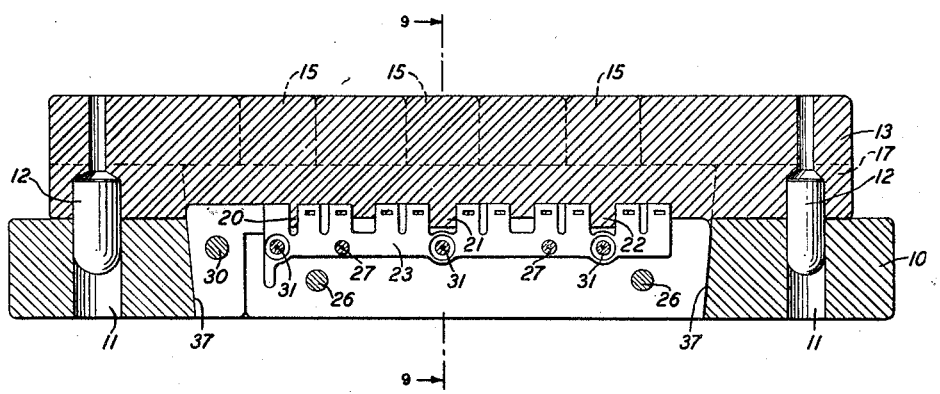
Fig. 8 is a longitudinal sectional view showing the entire molding fixture with the contact bars in position.
Figure 9:
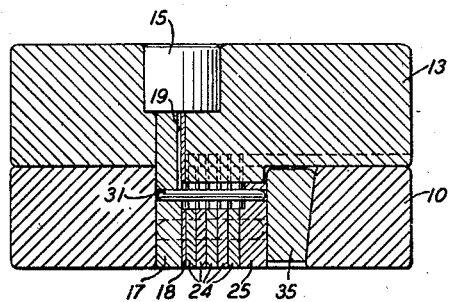
Fig. 9 is a cross-sectional view taken along with the lines 8—8 of Fig. 7 and looking in the direction of the arrows.

Referring particularly to Fig. 1, the molding fixture comprises a lower member 10 provided with openings 11—11 which are adapted to register with the pins 12—12 of the upper member 13 to hold the two members together in accurate alignment. The lower member 10 is provided with a central rectangular opening 14 in which are assembled the contact members to be fixed in position together with the gauge plates as more clearly brought out in Figs. 2 and 3. The upper member 13 is provided with circular openings 15—15 (see also Fig. 8) through which insulating material is injected as will be explained later. These openings extend into a longitudinal slot 16 in which also extend the upper portions of molding plates 17 and 18, the former of which is provided with slots 19—19 which serve as gates for the molding material. The upper member 13 is also provided with projecting ridges 20, 21 and 22 which are adapted to fit between adjacent finger members of the contact bars to serve as barriers for confining the insulating material to be injected later. The contact bars 23—23 are assembled alternately with the accurately ground gauge plates 24—24 between molding plates 18 and front plate 25 are held in position by pins 26—26 passing through suitable apertures in the front plate 25, gauge plates 24 and molding plates 17 and 18. To aid in accurately positioning the contact bars, pins 27—27 likewise pass through suitable apertures 28—28 in these members. To facilitate ejection of the molded assembly, the gauge plates are provided with L-shaped extension members 29—29 which are provided with suitable apertures to receive the pin 30. Pins 31—31 pass through close fitting apertures in plates 25, 17 and 18 and through larger openings 32—32 in the gauge plates 24. The contact bars as shown in Fig. 5 are provided with enlarged openings 33—33 in which the pins 31—31 are centrally located thereby leaving suitable space for the injection of molding material. The gauge plates 24 as shown in Fig. 6 are provided with slots 34 accurately ground to the maximum allowable thickness permitted for the sheet stock from which the contact bars are punched and into which the contact bars are positioned during assembly. The various parts are assembled as shown and positioned within the rectangular opening 14 of the lower member of the mold. The tapered wedge plate 35 is then forced into plate holding the parts in the predetermined positions. The ends of front plate 26, gauge plates 24 and plates 17 and 18 as well as extension members 28—29 are tapered as shown to insure a longitudinal alignment in the member 10 and to hold the assembled plates in the tapered walls 37—37.

Figure 7:
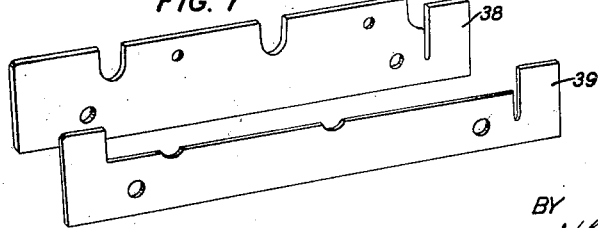
Fig. 7 is a modified arrangement in which the gauge block for receiving the contact member is made in two parts.

Instead of providing a single-piece gauge plate with an accurately ground slot therein, an alternative method is to employ a two-piece plate as shown by Fig. 7 in which the thickness of plate 38 determines the separation between adjacent contact bars and the plate 39 has a thickness corresponding to the maximum limit of thickness of the contact bar stock.

After the contact bars and associated plates are accurately secured in position in the lower portion of the mold the upper portion of the mold is positioned by means of pins 12—12 cooperating with apertures 11—11 and insulating material is injected through the circular openings 15. This material flows through the slots 19 and around pins 31—31 to form insulators 40—40 which permanently lock the contact bars in position. These insulators are provided with central openings 41—41 corresponding to the diameter of the pins 31 which permit the insertion of screws therethrough for mounting purposes.

Since it is possible to obtain commercial sheet metal stock which is held to very close limits as regards thickness, the molding fixture as described above makes it possible to rapidly assemble contact members of such stock so that they are precisely locked in predetermined positions and the expensive work of adjusting these parts is practically eliminated.

While the invention is described in connection with the manufacture of switch bars, it is equally applicable to the assembly of the spring pile-ups of relays and similar apparatus in which the advantages of precise and permanent positioning and the elimination of adjustment to a large degree is obtained.

What is claimed is:

1. A laminated molding fixture for assembling electrical contact members comprising a plurality of gauge blocks having a thickness corresponding accurately to the desired spacing between center lines of adjacent contact members, each of said gauge blocks being provided with a slot therein to receive one of said contact members, said slots having a depth accurately determined by the maximum allowable thickness of the contact member, said gauge blocks being provided with openings in alignment with cooperating openings in the contact members, means for clamping said block together, and means for introducing insulating material into the openings in said gauge blocks and contact members to interlock said contact members and thereby insure permanence of location.

2. A laminated molding fixture for assembling electrical contact members comprising a plurality of gauge blocks having a thickness corresponding accurately to the desired spacing between center lines of adjacent contact members, each of said gauge blocks being provided with a longitudinal slot therein to receive one of said contact members, said longitudinal slots having a depth accurately determined by the maximum allowable thickness of the contact member, each of said gauge blocks being provided with transverse slots in alignment with suitable openings in said contact members, and means for introducing insulating material into said transverse slots and cooperating openings in the contact members to interlock said contact members.

3. A laminated molding fixture for assembling electrical contact members comprising a plurality of gauge blocks having a thickness corresponding accurately to the desired spacing between center lines of adjacent contact members, each of said gauge blocks being provided with a longitudinal slot therein to receive one of said contact members, said longitudinal slots having a depth accurately determined by the maximum allowable thickness of the contact member, each of said gauge blocks being provided with transverse slots in alignment with suitable openings in said contact members, a plurality of pins engaging corresponding openings in said gauge blocks and contact members for maintaining said blocks and contact members in alignment, a plurality of other pins positioned centrally in the transverse slots of said gauge members and openings of said contact members, said other pins being of smaller diameter than the slots and openings in said respective members, and means for introducing insulating material about said other pins and in said slots and openings to interlock said members with blocks of insulating material having central openings therein.

4. A laminated molding fixture for assembling electrical contact members comprising a plurality of gauge blocks having a thickness corresponding accurately to the desired spacing between center lines of adjacent contact members, each of said gauge blocks being provided with a longitudinal slot therein to receive one of said contact members, said longitudinal slots having a depth accurately determined by the maximum allowable thickness of the contact member, each of said gauge blocks being provided with transverse slots in alignment with suitable openings in said contact members, a plurality of pins engaging corresponding openings in said gauge blocks and contact members for maintaining said blocks and contact members in alignment, a plurality of other pins positioned centrally in the transverse slots of said gauge members and openings of said contact members, said other pins being of smaller diameter than the openings in said members and a plate member having vertical slots therein opening into the transverse slots in said gauge blocks whereby insulating material may be introduced into said transverse slots to interlock said contact members in position.

5. A laminated molding fixture for assembling electrical contact members comprising a plurality of gauge blocks accurately ground to a thickness equal to the desired spacing between center lines of contact members, each of said gauge blocks being provided with a slot adapted to receive one of said contact members, said slots being accurately ground to a depth equal to the maximum allowable thickness of the contact member stock, said gauge blocks being provided with transverse slots in alignment with suitable openings in said contact members, means for accurately positioning said contact members in said slots, means for clamping said gauge blocks and assembled contact members in position, and means for injecting molding material into said transverse slots and cooperating openings in the contact members to lock said contact members in position.

6. A laminated molding fixture for assembling electrical contact members comprising a base member having a centrally located rectangular opening therein, the front and end walls defining said opening being tapered downward toward the center, a plurality of accurately ground gauge blocks having their end portions tapered to engage said end wall means for aligning said gauge blocks, each of said gauge blocks being provided with an accurately ground slot to receive one of said contact members and a wedge-shaped member engaging the front wall of said opening for clamping said aligned blocks in position in said opening.

7. A laminated molding fixture for assembling electrical contact members comprising a base member having a centrally located opening therein, a plurality of accurately ground gauge blocks positioned in said opening and each having an accurately ground slot therein adapted to receive one of the contact members to be assembled, a plurality of transverse slots in said gauge blocks cooperating with suitable aligned openings in said contact members, and a cover member cooperating with said base member and having suitable openings therethrough to permit injection of insulating material into the transverse slots of said gauge blocks and the cooperating openings in the contact members to lock said contact members in position.

8. A laminated molding fixture for assembling electrical contact members comprising a base member having a centrally located opening therein, a plurality of accurately ground gauge blocks positioned in said opening and each having an accurately ground slot therein adapted to receive one of the contact members to be assembled, a plurality of transverse slots in said gauge blocks in alignment with suitable openings in said contact members, and a cover member cooperating with said base member and having suitable openings therethrough to permit injection of insulating material into the transverse slots of said gauge blocks and the aligned openings in the contact members to lock said contact members in position, said cover member being provided with suitable ridges in alignment with the transverse slots of said gauge plates to serve as upper barriers for said insulating material.

TREVOR S. HUXHAM.